Figure 1:
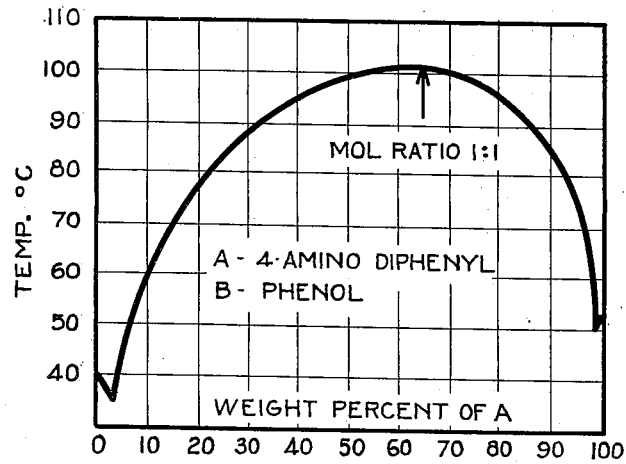

Jan. 25, 1938.    R. L. JENKINS    2,106,550
4-AMINODIPHENYL COMPLEX
Filed Nov. 9, 1934

INVENTOR
R. L. JENKINS
BY
ATTORNEY

Patented Jan. 25, 1938

2,106,550

UNITED STATES PATENT OFFICE 2,106,550

4-AMINODIPHENYL COMPLEX

Russell L. Jenkins, Anniston, Ala., assignor, by mesne assignments, to Monsanto Chemical Company, a corporation of Delaware Application November 9, 1934, Serial No. 752,220

5 Claims. (Cl. 260—130.5)

This invention comprises molecular complexes of 4-aminodiphenyl and hydroxybenzenes.

The object of this invention is to provide new complexes of 4-aminodiphenyl and monocyclic phenols. Such compounds are useful as rubber accelerators, as additive agents to gasoline, for disinfecting and preservative purposes, and other general chemical purposes where the amino and phenolic grouping is required in complex form.

Reference is made to the accompanying drawing, the three figures of which illustrate the freezing points of several of the complexes which may be formed, as well as the freezing points (or hold points) of compositions containing varying proportions of the complexes.

In the drawing:

Figure 1 shows the melting point range for the system: 4-aminodiphenyl, phenol, and indicates a molecular complex of the type $$NH_2(para) C_{12}H_9.HOC_6H_5,$$

having a melting point of approximately 101.4° C. This material is a crystalline compound. This figure also illustrates the freezing points (or hold points) of compositions containing varying proportions of the complex together with one or the other of its constituent substances. The presence of a eutectic at each end of the freezing or melting point composition curve is indicated by the drop of the freezing point curve to the minimum values shown on the diagram.

Figure 2:
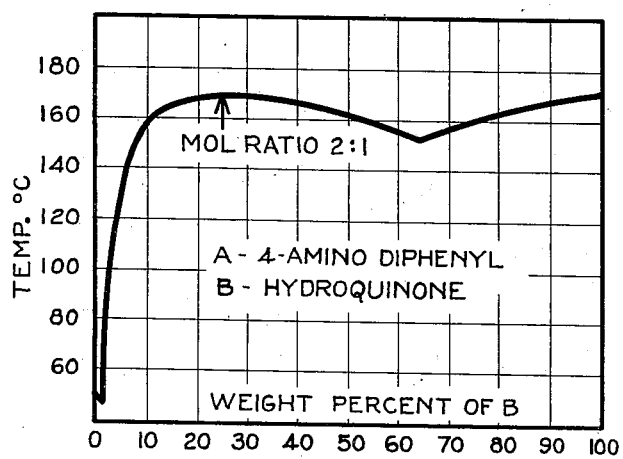

Figure 2 shows the freezing point range for the system: 4-aminodiphenyl, hydroquinone, and indicates a molecular complex of the type $$2[NH_2(para) C_{12}H_9].(HO)_2(1,4) C_6H_4,$$

having a melting point of approximately 167° C. This material is a crystalline compound. This figure also illustrates the melting points of compositions containing varying proportions of the complex together with one or the other of its constituent substances. The presence of two eutectics is indicated on the melting point curve.

Figure 3:
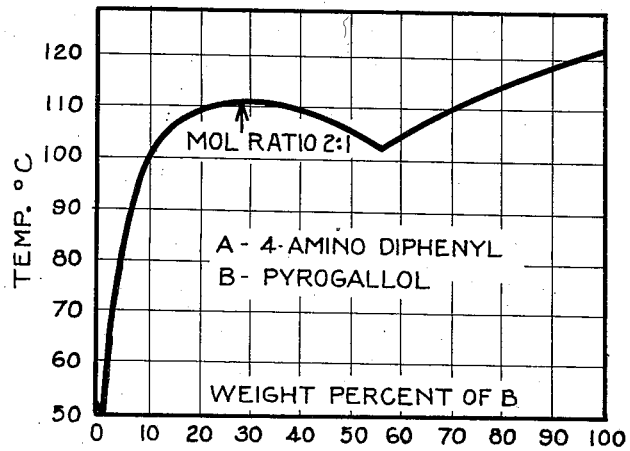

Figure 3 shows the melting point range for the system 4-aminodiphenyl, pyrogallol, and indicates a molecular complex of the type $$2[NH_2(para) C_{12}H_9].(HO_3) (1,2,3) C_6H_3,$$

having a melting point of approximately 110.5° C. This material is a crystalline compound. This figure also illustrates the melting points of compositions containing varying proportions of the complex together with one or the other of its constituent substances. The presence of two eutectics is indicated by the drop of the melting point curve to the minimum values shown on the diagram.

The complex and compositions shown above may be prepared by mixing together the constituent compounds in the proportion indicated and melting and mixing the mixture. An alternative method is to effect the combination by mixing together solutions containing the constituent compounds and thereby causing the complex to precipitate from the solution.

I have observed that the complexes described are less soluble in nearly all solvents than the constituent compounds thereof. This fact affords a ready means for removing from solution any one of the constituent compounds by the addition to the solution of a stoichiometric quantity of the other constituent of the complex. This constitutes a convenient method for preparing the complex and also affords a means for removing the constituents from solution.

The complex may be broken up by forming a salt of one of the constituent compounds by the addition of an acid or an alkali to the complex. Accordingly, I may add an acid to the complex and thereby form the acid salt of the amine. The acid salt being soluble, I then leach the acid salt from the complex. If the acid chosen forms an insoluble salt with the amine, then a solvent capable of selectively dissolving the phenol is chosen.

On the other hand, if the phenolic body is desired in soluble form as the phenate, I add an alkali, say an alkali metal hydroxide solution, to the complex, the phenolic body being thereby converted to the phenate and rendered soluble. Simple leaching then serves to remove the phenate. By these means I may readily form and as readily decompose the complexes.

I have found that the hydroxybenzenes generally are capable of forming the aminodiphenyl complex described.

Having now particularly described my invention and the manner of compounding the same, it will be apparent that it is susceptible to various changes and modifications without departing from the spirit thereof, and I desire therefore that it be not limited except as necessitated by the prior art or as specifically set out in the appended claims.

What I claim is:

1. An addition compound of 4-aminodiphenyl and hydroquinone.

2. An addition compound of 4-aminodyphenyl and pyrogallol.

3. An addition compound of 4-aminodyphenyl and phenol.

4. The addition salt of 4-aminodiphenyl and a compound selected from the class consisting of phenol, hydroquinone and pyrogallol.

5. As a chemical compound, an addition product of 4-aminodiphenyl and a monocyclic phenol containing from one to three hydroxyl groups, said addition product being characterized in that upon the addition of acid thereto, the 4-aminodiphenyl acid addition salt and the phenol are liberated.

RUSSELL L. JENKINS.